Nov. 10, 1942.   H. J. CRAIG ET AL   2,301,377
ROTARY RELEASING SOCKET
Filed Sept. 29, 1941   2 Sheets-Sheet 2
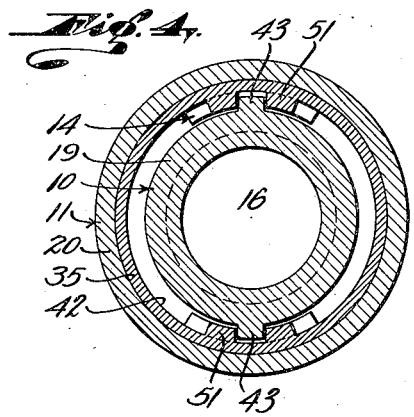
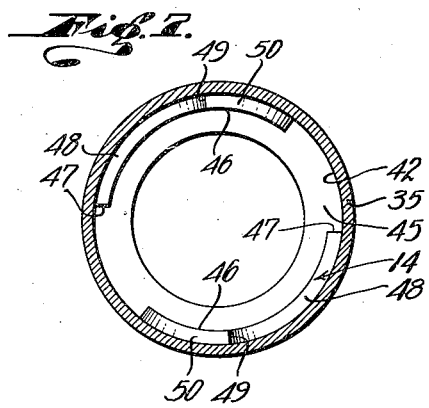
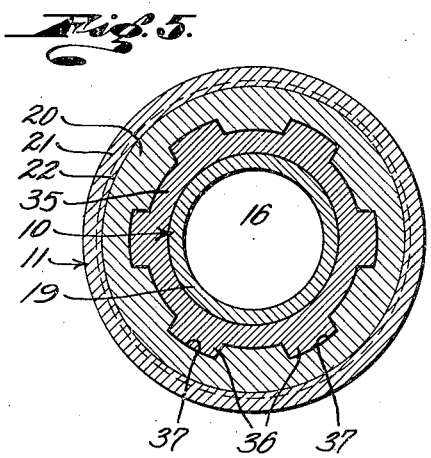
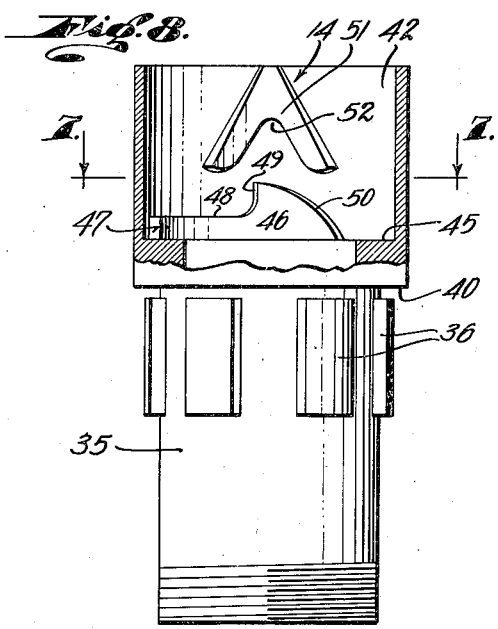
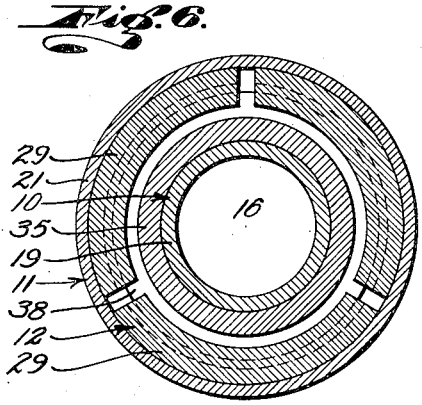
Inventors
HARLEY J. CRAIG,
HENRY CARROLL BROWN
and DOUGLAS RAGLAND
By
Their Attorney Patented Nov. 10, 1942

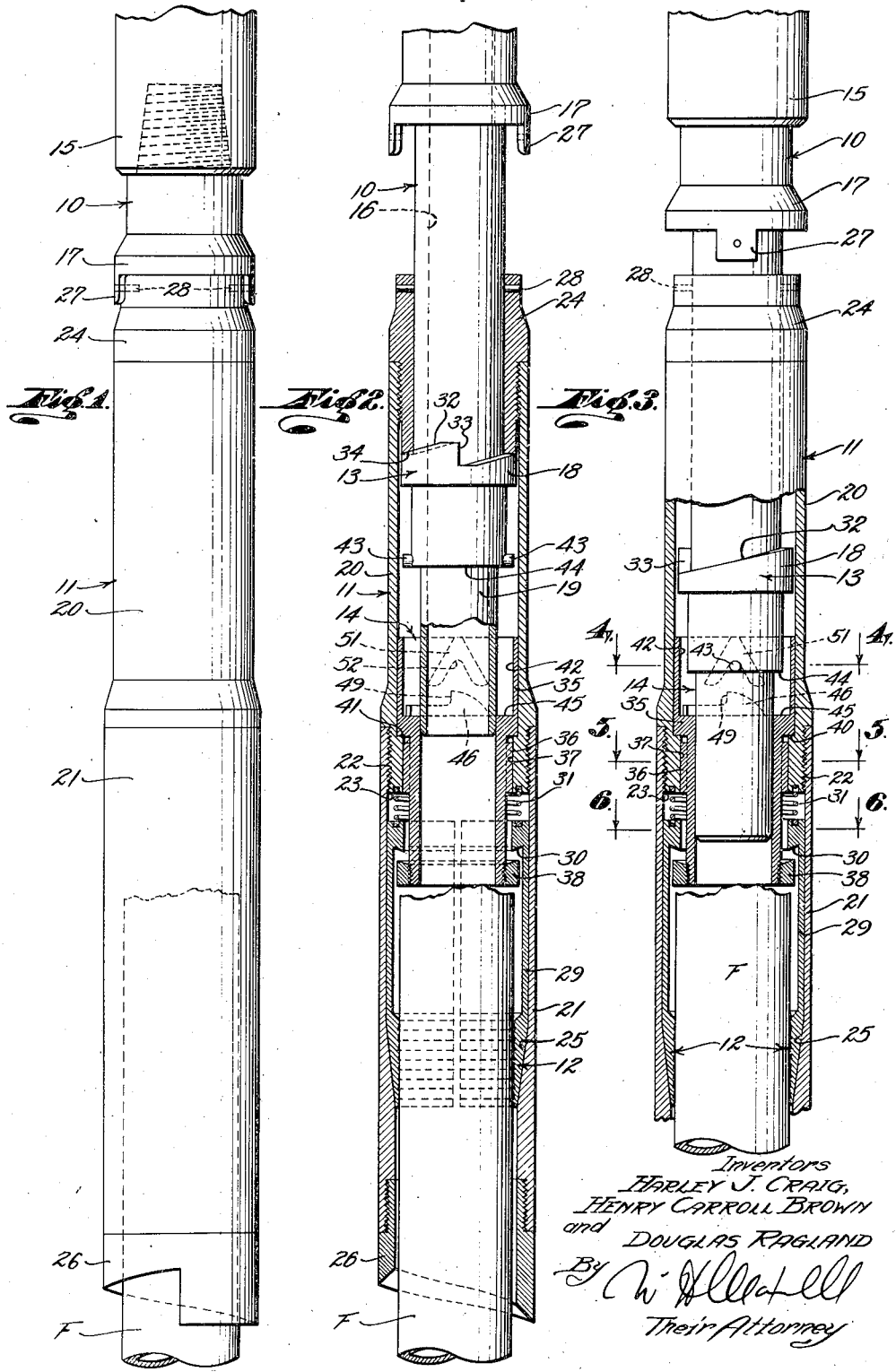

2,301,377

UNITED STATES PATENT OFFICE 2,301,377

ROTARY RELEASING SOCKET

Harley J. Craig and Henry Carroll Brown, Houston, and Douglas Ragland, Corpus Christi, Tex.; said Craig and Brown assignors to Baash-Ross Tool Company, Los Angeles, Calif., a corporation of California, and said Ragland assignor to Standard Oil Development Company, a corporation of Delaware Application September 29, 1941, Serial No. 412,900

15 Claims. (Cl. 294—102)

This invention relates to well tools and relates more particularly to fishing tools useful in recovering objects from wells. A general object of the invention is to provide a practical, effective fishing tool of the overshot or socket class, that is very easy to control, operate and release.

Another object of this invention is to provide a rotary releasing socket embodying means for imparting upward jarring blows to the fish for the purpose of freeing the same for removal.

Another and important object of the invention is to provide a rotary releasing socket that may be fully controlled, operated and released by turning the fishing string in one direction with appropriate vertical movement of the string. In the improved tool of the present invention the slips are operated to grip the fish by simple vertical movement of the string. Following setting of the slips the tool may be operated to jar the fish by right hand rotation of the fishing string while maintaining an up-pull on the string. If the jarring operation and the up-pull do not serve to free the fish the slips may be released from the fish by right hand rotation of the string followed by upward movement. Further, if it is desired to re-engage the tool with the fish this may be accomplished by right hand rotation of the string accompanied by suitable vertical manipulation. The tool is fully controlled and operated by turning or rotation of the fishing string in one direction with appropriate vertical manipulation of the string, it being unnecessary to at any time turn the string in the other direction.

Another object of this invention is to provide a rotary releasing socket embodying a novel control or latch means which provides for the full control of the tool by turning of the string in one direction only with accompanying or succeeding apropriate vertical movement of the string.

Another object of this invention is to provide a releasing socket of the character referred to in which the slips may be readily and positively freed or released by downward jarring action which frees the frictional engagement of the slips with the bowl.

Another object of this invention is to provide a fishing tool of the character mentioned in which the circulation fluid is delivered directly to the fish, being conducted through the latch means, jar means, etc.

Another object of this invention is to provide a releasing socket embodying a novel structure for effecting simultaneous release or retraction of the several slips.

A further object of this invention is to provide a releasing socket embodying a shear pin control or connection which permits initial positive engagement of the slips with the fish without disturbing or operating the control latch, jar means, etc.

The various objects and features of our invention will be fully understood from the following detailed description of a typical preferred form and application of the invention, throughout which description reference is made to the accompanying drawings, in which:

Fig. 1 is a side elevation of the tool provided by this invention showing it engaged over a fish. Fig. 2 is a central longitudinal detailed sectional view of the tool with the shear pin broken, the slips in gripping engagement with the fish and the jarring means in condition for operation. Fig. 3 is a fragmentary longitudinal detailed sectional view with the upper portion of the tool in side elevation and showing the latch means in condition to free or retract the slips. Figs. 4, 5 and 6 are enlarged transverse detailed sectional views taken as indicated by lines 4—4, 5—5, and 6—6, respectively, on Fig. 3. Fig. 7 is a transverse detailed sectional view taken as indicated by line 7—7 on Fig. 8 and Fig. 8 is an enlarged side elevation of the slip releasing sleeve removed from the tool with the upper portion appearing in longitudinal cross section to illustrate the latch means.

The fishing tool of the present invention may be said to comprise, generally, a mandrel 10 for connection with a fishing string, a tubular bowl or body 11 shiftably connected with the mandrel 10, slips 12 in the body 11 operable to grip a fish F, means 13 for imparting a jarring action to the fish F and means 14 for freeing or releasing the slips 12 from the fish F.

The mandrel 10 is an elongate tubular member adapted to be connected with the lower end of a fishing string. In the drawings it may be assumed that the sub 15 is the lower element of a tubular fishing string for carrying and operating the tool. In this instance, the upper end of the mandrel 10 is threaded in the sub 15. The central longitudinal fluid passage 16 of the mandrel 10 receives the circulation fluid from the fishing string and conducts it downwardly to adjacent the fish F, as will be more fully described. The mandrel 10 is provided with an annular flange 17 spaced a suitable distance from its upper end and has a second annular flange 18 spaced a considerable distance below the flange 17. The lower end portion 19 of the mandrel 10 is reduced in external diameter.

The body 11 is an elongate tubular structure or assembly carried on the mandrel 10 and serving to house and support the various other elements of the tool. In the construction illustrated the body 11 comprises two sections, namely, an upper section 20 and a lower section 21. The sections 20 and 21 have a screw threaded connection at 22 and the lower end of the section 20 provides a downwardly facing shoulder 23 in the body 11. A guide bushing 24 is threaded in the upper end of the section 20 and shiftably or slidably receives the mandrel 10. The guide bushing 24 of the body 11 is engaged on that portion of the mandrel 10 which lies between the flanges 17 and 18. A downwardly and inwardly tapered seat or bowl surface 25 is provided on the interior of the lower body section 21 to operate the slips 12, as will be later described. A suitable guide 26 may be provided on the lower end of the body 11 to assist in guiding the tool over the fish F.

The invention provides a frangible connection between the mandrel 10 and the body 11 for holding these parts in the retracted relationship illustrated in Fig. 1, so that the tool may be run into the well and engaged over the fish F with the parts in this relationship. As described above, the guide bushing 24 is slidably engaged on the mandrel 10 between the flanges 17 and 18. This provides a lost motion connection or slack connection between the mandrel 10 and body 11. In accordance with the invention the guide bushing 24 is initially attached to the flange 17 to hold the body 11 in the raised position relative to the mandrel 10. The flange 17 has depending ears 27 adapted to fit down over the exterior of the bushing 24. Shear pins 28 of selected strength are arranged in openings in the bushing 24 and ears 27 to detachably or releasably hold the body 11 in its raised initial position on the mandrel 10. It is to be observed that the ears 27 are set out so that they do not interfere with the direct cooperation of the end face of the flange 17 with the upper end of the bushing 24. This engagement is important, as will be later described.

The slips 12 are arranged in the bowl or lower section 21 of the body 11 and are operable through the action of the bowl surface 25 to grip the fish F. There is preferably an annular or tubular series of slips 12. In the drawings I have shown three like slips 12, each having a wedge-like active part seating on the surface 25. The outer sides of the active slip parts conform to the surface 25 and the inner sides of these parts have suitable teeth for gripping or biting the fish F. Rein portions 29 extend upwardly from the wedge parts of the slips 12 and terminate at their upper ends in thickened parts which present downwardly facing shoulders 30. Spring means is provided for holding the slips 12 in the operative position to grip the fish F. A spring 31 is arranged under compression between the shoulder 23 and the upper ends of the slips 12. It will be observed that the slips 12, even though held in place by the spring 31, do not project into the body 11 to interfere with the free passage of the tool over the fish F.

The means 13 is operable by rotation of the fishing string to impart upward jarring blows to the fish F through the medium of the body 11 and slips 12. This may be done when considered necessary to free or loosen the fish F for ready removal. The means 13 comprises sloping faces 32 on the upper end of the mandrel flange 18 terminating in abrupt or vertical shoulders 33 and complementary sloping faces 34 on the lower end of the bushing 24. In most applications of the invention the faces 32 and 34 are sloped or pitched to be operative to produce the jarring action when the fishing string is rotated in a right hand direction. When an upward strain is maintained on the fishing string and the string is rotated to the right the faces 32 slide over the faces 34 until the shoulders 33 suddenly drop over the shoulders of the surfaces 34 to produce the jarring action. In this way an effective upward vibration or jarring effect may be provided which, in most cases, will loosen or free the fish F for free removal.

The means 14 for freeing or releasing the slips 12 is a feature of the invention. The means 14 is such that the slips 12 may be readily disengaged from the fish F in the event that this may become necessary, following attempts to pull or jar the fish free. The slip releasing means 14 is characterized by the fact that it is fully operated by right hand rotation of the fishing string with appropriate vertical manipulation of the string. Right hand rotation of the fishing string accompanied by vertical manipulation operates the means 14 to retract or release the slips 12. The means 14 is releasable by right hand rotation of the fishing string with appropriate vertical manipulation of the string to permit reengagement of the slips 12 with the fish in the event this becomes desirable.

The means 14 includes a shiftable sleeve 35 in the body 11. The sleeve 35 is arranged in the intermediate portion of the body 11, having an upper part extending into the body section 20 and a lower part received in the body section 21. Splines 36 on the sleeve 35 slidably operate in grooves 37 in the body section 20 to hold the sleeve against turning movement, while permitting free axial movement. The lower portion of the sleeve 35 extends into the upper end of the tubular series of slips 25. A collar or nut 38 is threaded on the lower end of the sleeve 35 and is adapted to cooperate with the slip shoulders 30 to raise the slips 12 to inactive positions upon upward movement of the sleeve 35 with respect to the body 11. It is preferred to slope the shoulders 30 and the opposing end of the nut 38 downwardly and inwardly so that their cooperation tends to urge the slips inwardly as well as upwardly.

The sleeve 35 is provided with an external downwardly facing shoulder 40 engageable with an upwardly facing shoulder 41 on the interior of the section 21 to limit the downward travel of the sleeve. The upper portion of the opening 42 in the sleeve 35 is proportioned to receive the lower part of the mandrel 10 with substantial clearance, while the lower portion of the sleeve opening is reduced in diameter to slidably receive the reduced lower part 19 of the mandrel 10. The sleeve 35 is adapted to extend downwardly beyond the lower mandrel portion 19 and the sleeve opening 42 is adapted to carry the circulation fluid downwardly to immediately adjacent the upper end of the fish F, this being apparent from an inspection of Fig. 2.

The means 14 further includes a novel latch mechanism for releasably connecting the sleeve 35 with the mandrel 10 for operation thereby. The latch means connects the sleeve 35 with the mandrel 10 so that movement of the mandrel may free or retract the slips 12. It is a feature of the invention that the latch means may be engaged, disengaged and re-engaged by turning of the fishing string in one direction, say the right hand direction, with accompanying vertical manipulation, and it is never necessary to turn the string in the reverse or left hand direction.

The novel latch means comprises one or more lugs 43 on the mandrel 10. In the drawings we have shown two diametrically opposite lugs 43 positioned immediately above the shoulder 44 which occurs on the mandrel 10 at the upper end of its reduced portion 19. The latch means further includes latch parts formed on the interior of the sleeve 35 and engageable by the lugs 43. An upwardly facing annular shoulder 45 is formed on the interior of the sleeve 35 at the point of graduation or change in diameter of its opening. Two diametrically opposite stop and guide abutments 46 are provided on the wall of the sleeve opening 42 above the shoulder 45. Each abutment 46 has what I will term a primary shoulder 47 extending upwardly or vertically from the shoulder 45 and facing rearwardly relative to the right hand direction of rotation. The tops of the abutments 46 are stepped back from the shoulders 45, presenting generally horizontal ledges 48 which extend forwardly or in the right hand direction from the primary shoulders 47. Secondary shoulders 49 occur at the inner or forward ends of the ledges 48. The formation of the abutments 46 is best illustrated in Fig. 8 of the drawings. Suitable gradual curves may connect the ledges 48 and the secondary shoulders 49. The upper edges of the abutments 46 have surfaces 50 which slope or curve downwardly and forwardly from the upper ends of the secondary shoulders 49 to the shoulder 45. The parts of the tool are preferably formed and related so that the lugs 43 engage the primary shoulders 47 and the annular shoulder 45 of the sleeve 35 when the body 11 is connected with the mandrel 10 by the shear pins 28. The lugs 43 engaged with the shoulders 45 and the primary shoulders 47 relieve the shear pins 28 of vertical thrusts and right hand thrusts to which they may be subjected in handling the tool and in lowering the tool into the well to engage over the fish F.

The means 14 further includes a latch part or keeper part 51 of inverted V-shape provided on the wall of the sleeve opening 42 above each abutment 46. The keeper parts 51 are located so that the centers of their notches 52 are directly above and slightly forward of the secondary shoulders 49 relative to the right hand direction of turning, as shown in Figs. 2, 3 and 8. The apices of the inverted V-shaped parts 51 occur at the upper ends of the sleeve 35 and the sloping or downwardly divergent arms of the V-shaped parts serve to divert the lugs 43 from the abutments 46 when the mandrel 10 is moved downwardly with respect to the body 11 in operations subsequent to the breaking of the shear pins 28.

In the use or operation of the improved socket of this invention the parts are assembled to have the lugs 43 engage the shoulder 45 and the primary abutment shoulders 47 and the body 11 is secured to the mandrel 10 by the shear pins 28. The tool thus assembled is secured to the lower end of a tubular fishing string and is run down through the well on the string. The string is lowered and manipulated to engage the lower body section 21 over the fish F. The fishing string is then given a short upward movement to set or engage the slips 12 with the fish F. This initial actuation is not usually sufficient to break the shear pins 28. However, continued or further upward movement of the fishing string subsequent to setting of the slips 12 breaks the shear pins 28 and allows the mandrel 10 to move upwardly with respect to the body 11. This upward movement and the resultant engagement of the flange 18 with the lower end of the bushing 24 may further tighten the slips 12 on the fish F. It will be observed that when the shear pins 28 fail and the mandrel 10 moves upwardly with respect to the body 11 the lugs 43 move upwardly out of engagement with the abutments 46 and assume clear positions such as shown in Fig. 2. An upward strain may now be put on the fishing string to withdraw the fish F.

In the event the fish cannot be pulled free in this way an upward strain is taken on the fishing string and the string is turned or rotated to the right. Rotation of the mandrel 10 to the right while maintaining a strain on the fishing string results in a jarring of the fish F. The surfaces 32 ride over the surfaces 34 until the shoulders 33 leave the surfaces 34 whereupon the flange 18 jars against the lower end of the bushing 24 to provide a sharp jarring blow. Thus, rotation of the string to the right while maintaining an upward strain on the string produces an effective upward jarring action or vibration which is transmitted to the fish F through the body 11 and the slips 12. This vibratory motion or jarring action is often effective in loosening the fish so that it may be withdrawn from the well.

In the event that the above described operations are not successful in freeing the fish F it may be desirable to disengage the socket from the fish in order that other steps may be taken to recover the fish. In this event the string is lowered. It may be desired to lower the fishing string quite suddenly so that the lower side of the flange 17 strikes the upper end of the bushing 24 a sharp blow. This jars the body 11 downwardly and frees the frictional engagement of the slips 12 with the bowl surface 25. If desired, the fishing string may be reciprocated to impart several of these downward jarring blows to the body 11 to free the slips 12. The mandrel 10 is then brought to a position where the shoulder 44 engages the shoulder 45 and the mandrel is turned to the right. This brings the lugs 43 against the primary shoulders 47. A slight right hand torque is then put on the fishing string and mandrel 10 and the mandrel is moved upwardly. These operations disengage the lugs 43 from the primary shoulders 47 and cause the lugs to assume positions against the secondary shoulders 49. An upward movement of the mandrel 10 moves the lugs 43 into the notches 52 of the catch parts 51. With the lugs 43 engaged in the notches 52 the fishing string and mandrel 10 are raised to release the slips 12. The upward movement of the mandrel 10 is transmitted to the sleeve 35 by the engagement of the lugs 43 in the notches 52 and the collar 38 on the sleeve 35 engages the shoulders 30 to move the slips 12 upwardly with respect to the body 11. This upward movement of the slips 12 relative to the body 11 is effective in fully freeing or releasing the slips 12. With the slips 12 released in this way and suspended in the released position by the engagement of the collar 38 with the shoulders 30 the tool may be readily slipped off the fish F and withdrawn from the well.

Instead of withdrawing the tool from the well it may be desired to re-engage the tool with the fish. If this is the case the tool is manipulated to again engage down over the fish F. With the lugs 43 engaged in the notches 52 the operator may rotate the string in order to rotate the socket over the fish F. The fishing string is lowered and turned to the right. This causes the lugs 43 to move down out of the notches 52 and to ride down the surfaces 50 to the shoulder 45. The lugs 43 are thus released from the catch parts 51 and the mandrel 10 may be raised to actuate the slips 12. The slips 12 are actuated as above described and the fish F may be jarred by the means 13, as fully described above.

Having described only a typical preferred form and application of our invention, we do not wish to be limited or restricted to the specific details herein set forth, but wish to reserve to ourselves any variations or modifications that may appear to those skilled in the art, or fall within the scope of the following claims.

Having described our invention, we claim:

1. A tool for use on a well string comprising a mandrel to be secured to the string, a body connected with the mandrel, the mandrel and body being related for relative movement, slips carried by the body to grip an object in the well upon upward movement of the body, a member movable relative to the body operable to support the slips in a retracted position, and means operable by axial and turning movement of the mandrel for connecting the member with the mandrel to be moved thereby to the position where the slips are retracted.

2. A tool for use on a well string comprising a mandrel to be secured to the string, a body connected with the mandrel, the mandrel and body being related for relative movement, slips carried by the body to grip an object in the well upon upward movement of the body, a member movable relative to the body to retract the slips, and latch means engageable upon axial and turning movement of the mandrel in one direction to connect the member with the mandrel to be moved thereby to retract the slips, the latch means being releasable upon axial and turning movement of the mandrel in said direction.

3. A tool for use on a well string comprising a mandrel to be secured to the string, a body connected with the mandrel, the mandrel and body being related for relative movement, slips carried by the body to grip an object in the well upon upward movement of the body, a member movable upwardly relative to the body to retract the slips, and latch means for coupling the member with the mandrel for said upward movement thereby, engaged and disengaged by axial and turning movement of the mandrel in one direction.

4. A tool for use on a well string comprising a mandrel to be secured to the string, a body connected with the mandrel, the mandrel and body being related for relative movement, slips carried by the body to grip an object in the well upon upward movement of the body, a member movable upwardly relative to the body to retract the slips, and latch means for coupling the member with the mandrel for said upward movement thereby, engaged and disengaged by axial and turning movement of the mandrel in one direction, the latch means comprising a part on the member defining a notch, a lug on the mandrel engageable in the notch and a part on the member for directing the lug into and out of the notch upon said axial and turning movement of the mandrel.

5. A tool for use on a well string comprising a mandrel to be secured to the string, a body connected with the mandrel, the mandrel and body being related for relative movement, slips carried by the body to grip an object in the well upon upward movement of the body, faces on the body and mandrel adapted to jar together upon downward movement of the mandrel relative to the body to loosen the frictional engagement between the body and slips, and means operable by axial movement and turning movement of the mandrel for retracting the slips.

6. A tool for use on a well string comprising a mandrel to be secured to the string, a body connected with the mandrel, the mandrel and body being related for relative movement, slips carried by the body to grip an object in the well upon upward movement of the body, cooperable jar parts on the mandrel and body operable to impart upward jarring blows to the body and fish, and means operable by axial movement and turning movement of the mandrel relative to the body for freeing the slips from the object.

7. A tool for use on a well string comprising a mandrel to be secured to the string, a body connected with the mandrel, the mandrel and body being related for relative movement, slips carried by the body to grip an object in the well upon upward movement of the body, cooperable jar parts on the mandrel and body operable to impart upward jarring blows to the body and fish, faces on the mandrel and body adapted to jar together upon downward movement of the mandrel relative to the body to release the frictional engagement between the body and slips, and means operable by axial movement and turning movement of the mandrel relative to the body for freeing the slips from the object.

8. A well tool of the character described for use on a well string including a mandrel on the string, a tubular body receiving the mandrel, the mandrel being turnably and axially shiftable relative to the body, a bowl on the body, slips in the bowl operable by upward movement thereof to grip an object in the well, a sleeve in the body operable by upward movement to retract the slips, and latch means for connecting the mandrel with the sleeve so that the sleeve may be raised to release the slips, the latch means comprising a part of inverted V shape on the sleeve, and a lug on the mandrel engageable with the under side of the part to contact the sleeve with the mandrel for upward movement therewith.

9. A well tool of the character described for use on a well string including a mandrel on the string, a tubular body receiving the mandrel, the mandrel being turnably and axially shiftable relative to the body, a bowl on the body, slips in the bowl operable by upward movement thereof to grip an object in the well, a sleeve in the body operable by upward movement to retract the slips, and latch means for connecting the mandrel with the sleeve so that the sleeve may be raised to release the slips, the latch means comprising a part of inverted V shape on the sleeve, a lug on the mandrel engageable with the under side of the part so that the sleeve may be raised by the mandrel, and an abutment part on the sleeve for directing the lug into and out of engagement with the first named part upon turning of the mandrel in one direction with accompanying axial movement of the mandrel.

10. A well tool of the character described for use on a well string including a mandrel on the string, a tubular body receiving the mandrel, the mandrel being turnably and axially shiftable relative to the body, a bowl on the body, slips in the bowl operable by upward movement thereof to grip an object in the well, a sleeve in the body operable by upward movement to retract the slips, and latch means for connecting the mandrel with the sleeve so that the sleeve may be raised to release the slips, the latch means comprising a part of inverted V shape on the sleeve, a lug on the mandrel engageable with the under side of the part so that the sleeve may be raised by the mandrel, and an abutment part on the sleeve for directing the lug into and out of engagement with the first named part upon turning of the mandrel in one direction with accompanying axial movement of the mandrel, the abutment having a primary shoulder for stopping the lug before it passes under said first named part and a secondary shoulder stepped upwardly and forwardly from the primary shoulder for stopping the lug where it may move upwardly into latching cooperation with said first named part.

11. A well tool of the character described for use on a well string including a mandrel on the string, a tubular body receiving the mandrel, the mandrel being turnably and axially shiftable relative to the body, a bowl on the body, slips in the bowl operable by upward movement thereof to grip an object in the well, a sleeve in the body operable by upward movement to retract the slips, and latch means for connecting the mandrel with the sleeve so that the sleeve may be raised to release the slips, the latch means comprising a part of inverted V shape on the sleeve, a lug on the mandrel engageable with the under side of the part so that the sleeve may be raised by the mandrel, and an abutment part on the sleeve for directing the lug into and out of engagement with the first named part upon turning of the mandrel in one direction with accompanying axial movement of the mandrel, the abutment having a primary shoulder for stopping the lug before it passes under said first named part, a secondary shoulder stepped upwardly and forwardly from the primary shoulder for stopping the lug where it may move upwardly into latching cooperation with said first named part and a face sloping downwardly and forwardly from the secondary shoulder to guide the lug from under said first named part.

12. A well tool of the character described for use on a well string including a mandrel on the string, a tubular body receiving the mandrel, the mandrel being turnably and axially shiftable relative to the body, a bowl on the body, slips in the bowl operated by upward movement thereof to grip an object in the well, frangible means for connecting the mandrel and body against relative movement released following actuation of the slips, a sleeve in the body operable by upward movement to retract the slips, and latch means for connecting the mandrel with the sleeve so that the sleeve may be raised to release the slips, the latch means comprising a part of inverted V shape on the sleeve, and a lug on the mandrel engageable with the under side of the part to connect the sleeve with the mandrel for upward movement therewith.

13. A tool for use on a well string comprising a mandrel to be secured to the string, a body connected with the mandrel, the mandrel and body being related for relative movement, slips carried by the body to grip an object in the well upon upward movement of the body, a member movable upwardly relative to the body to retract the slips, means operable by rotation of the mandrel in one direction for imparting upward jarring blows to the body and object, and latch means engageable and disengageable by turning of the mandrel in said direction with axial manipulation of the mandrel whereby the slips may be retracted and later returned for operation.

14. A tool for use on a well string comprising a mandrel to be secured to the string, a body connected with the mandrel, the mandrel and body being related for relative movement, slips carried by the body to grip an object in the well upon upward movement of the body, frangible means for connecting the mandrel and body against relative movement adapted to be broken following actuation of the slips, a member movable upwardly relative to the body to retract the slips, and latch means for coupling the member with the mandrel for said upward movement thereby, engaged and disengaged by axial and turning movement of the mandrel in one direction, the latch means comprising a part on the member defining a notch, a lug on the mandrel engageable in the notch and a part on the member for directing the lug into and out of the notch upon said axial and turning movement of the mandrel.

15. A tool for use on a well string comprising a mandrel to be secured to the string, a body connected with the mandrel, the mandrel and body being related for relative movement, slips carried by the body to grip an object in the well upon upward movement of the body, frangible means connecting the body and mandrel against relative movement broken by upward movement of the mandrel following actuation of the slips, means made operative upon breaking of the frangible means for producing an upward jarring action on the body, a member movable upwardly relative to the body to retract the slips, and latch means for coupling the member with the mandrel for said upward movement thereby, engaged and disengaged by axial and turning movement of the mandrel in one direction, the latch means comprising a part on the member defining a notch, a lug on the mandrel engageable in the notch and a part on the member for directing the lug into and out of the notch upon said axial and turning movement of the mandrel.

DOUGLAS RAGLAND.
HARLEY J. CRAIG.
HENRY CARROLL BROWN,